United States Patent [19]
Garratt et al.

[11] 3,892,884
[45] July 1, 1975

[54] METHOD FOR THE PREPARATION OF PROTECTIVE COATING

[75] Inventors: Peter Garth Garratt, Wallisellen; Juerg Hoigne, Zurich, both of Switzerland

[73] Assignee: Lonza Ltd., Gampel/Valais, Switzerland

[22] Filed: Jan. 25, 1972

[21] Appl. No.: 220,684

Related U.S. Application Data
[63] Continuation-in-part of Ser. No. 41,048, May 27, 1970, abandoned.

[30] Foreign Application Priority Data
May 30, 1969  Switzerland.......................... 8218/69

[52] U.S. Cl. .............. 427/36; 204/159.17; 260/884
[51] Int. Cl. ........................... B44d 1/50; C08f 3/32
[58] Field of Search ... 117/93.31, 161 UH, 161 UZ, 117/161 UL, 162; 204/159.17; 260/884, 878

[56] References Cited
UNITED STATES PATENTS

| | | | |
|---|---|---|---|
| 2,965,553 | 12/1960 | Dixon et al. ..................... | 260/875 R |
| 3,143,521 | 8/1964 | Thompson et al. .............. | 260/878 R |
| 3,453,195 | 7/1969 | Kuhne................................ | 260/884 |
| 3,496,251 | 2/1970 | Takahashi et al................ | 260/878 R |
| 3,565,974 | 2/1971 | Ohnuma et al. ................. | 260/878 R |

*Primary Examiner*—Michael Sofocleous
*Assistant Examiner*—John H. Newsome
*Attorney, Agent, or Firm*—Cooper, Dunham, Clark, Griffin & Muran

[57] ABSTRACT

A material useful as a protective coating is obtainable by subjecting a synthetic resin mixture containing a chlorinated polyolefin, such as chlorinated polyethylene, chlorinated polypropylene, chlorinated polybutylene or a chlorinated natural or synthetic rubber and a reactive olefinically unsaturated monomer selected from ethyl or butyl acrylate, butyl methacrylate or ethyl hexyl acrylate to ionizing radiation such as $\gamma$-ray radiation.

16 Claims, No Drawings

METHOD FOR THE PREPARATION OF PROTECTIVE COATING

RELATED APPLICATION

This application is a continuation-in-part of our earlier filed, copending application, Ser. No. 41,048, filed May 27, 1970 now abandoned.

It is known to considerably accelerate the crosslinking of synthetic resins by means of the effects of ionizing radiation, for instance X-rays, gamma-rays, beta-particles or beams of energetically accelerated electrons. In most practical applications of these irradiation methods, electrons with an energy between 50 and 4000 keV were used.

The Swiss Patent No. 399,259 describes further the use of ionizing radiation for the hardening of synthetic resin coatings which consist of mixtures of unsaturated polyesters and of reactive olefinically unsaturated monomers. The hardening of the organic synthetic resin is achieved by subjecting the coatings to an ionizing electron radiation with the average energy of the electrons not exceeding 250 keV and the applied radiation dose being between 30 and 60 magarads.

The U.S. Pat. No. 3,247,012 describes a special method for hardening synthetic resin coatings consisting of unsaturated polyester resins and reactive monomers by means of the use of an ionizing electron beam with an effective energy of 150 to 450 keV, with the absorbed radiation dose being approximately 1 megarad.

The invention refers to a method for the hardening of synthetic resins, particularly in the shape of thin layers or coatings, by means of ioizing radiation wherein synthetic resin mixtures are used which contain a. chlorinated polyolefins as pre-polymers and
b. reactive, olefinically unsaturated monomers.

It has been observed that cross-linked products with the properties of a good lacquer can be obtained if a polymer containing chlorine is used as pre-polymer.

The prepolymers used are at least one of chlorinated polyethylene, chlorinated polypropylene, chlorinated polybutylene, and chlorinated natural or synthetic rubber. Mixtures of these prepolymers can, of course, also be used. In addition to these prepolymers which are being used in accordance with the invention, other pre-polymers can also be added which are used in methods that are already known.

The monomers used are at least one of ethyl acrylate, butyl acrylate, butyl methacrylate or ethyl hexyl acrylate.

If desired, the synthetic resin mixtures may also contain plasticizers, fillers, pigments and stabilizers.

The amount of prepolymer in the synthetic resin mixture is advantageously 20 to 80% by weight, preferably 30 to 50% by weight.

The hardening of the synthetic resin mixture can be effected with any ionizing radiatin, preferably with an energy-rich electromagnetic radiation, for instance, with X-rays or gamma rays, and with accelerated electrons such as accelerated electrons having an average electron energy of 50 to 4000 keV. When hardening thin layers of the synthetic resin mixture, for instance, thin coatings, an average electron energy of 50 to 600 keV is used.

The synthetic resin mix can advantageously be submitted to an additional heat treatment before, during or after the hardening, whereby the cross-linking process is facilitated in some cases. It is desirable, however, to effect hardening in the basence of oxygen. In order to achieve this, a protective gas atmosphere is used, for instance, nitrogen. In some cases it is advantageous to add to the synthetic resin mixture small quantities of a polymerization catalyst which forms free radicals, for instance peroxides, azo compounds, persulfates.

This invention makes it possible to coat, in addition to metals, wooden materials, wood, etc., materials or substrates which are temperature-sensitive, e.g. plastics and paper, and to harden the coating.

Coatings and lacquer coatings made in accordance with the method of the invention are distinguished, compared to the unsaturated polyester compounds, by their resistance to saponification, improved resistance to corrosion and greater flame resistance.

The following examples are illustrative of the practice of this invention.

EXAMPLE I

90 Micron thick films of various synthetic resin mixtures, as listed in Table 1, were deposited on electrolytically pretreated steel sheets. After approximately 1½ to 2½ minutes these films were exposed to accelerated electrons with an average energy of 400 keV, by moving the sheets in the longitudinal direction through an electron beam (intensity of radiation 3 to 12 megarad/second). These tests were made at room temperature and without any particular steps to exclude oxygen. The films were then immediately tested for stickiness of the surface and their surface hardness was tested with a steel blade. The resistance of the synthetic resin films against chemical solvents was tested by application of a drop of toluene. The degree of crosslinking was determined by measuring the insoluble residue in Soxhler extraction apparatus after 24 hour extraction with toluene. Table 2 shows the results that were obtained. The hardening dose is the smallest radiation dose which was required in order to obtain a non-sticky film with satisfactory surface hardness.

Table 1

| Test No. | Prepolymer | Monomer | Weight Ratio Monomer — Prepolymer |
| --- | --- | --- | --- |
| 1 | Chlorinated Polypropylene (Alprodur 646 J) | n-Butyl acrylate | 1 : 1 |
| 2 | Chlorinated Polypropylene (Alprodur 646 J) | n-Butyl acrylate | 1 : 1 |
| 3 | Chlorinated Polypropylene (Alprodur 646 J) | n-Butyl acrylate + 20% AGD* | 1 : 1 |
| 4 | Chlorinated Polypropylene (Alprodur 646 J) | n-Butyl acrylate | 4 : 6 |
| 5 | Chlorinated Polypropylene (Alprodur 646 J) | n-Butyl acrylate | 3 : 7 |
| 6 | Chlorinated Polypropylene (Parlon P 20) | n-Butyl acrylate | 1 : 1 |

Table 1 — Continued

| Test No. | Prepolymer | Monomer | Weight Ratio Monomer — Prepolymer |
|---|---|---|---|
| 7 | Chlorinated Polypropylene (Alprodur 646 J) | Ethyl acrylate | 1 : 1 |
| 8 | Chlorinated Polypropylene (Alprodur 646 J) | n-Butyl methacrylate | 1 : 1 |
| 9 | Chlorinated Polyethylene (Alloprene CPE 20) | n-Butyl acrylate | 1 : 1 |
| 10 | Chlorinated Polyethylene (Alloprene CPE 20) | n-Butyl acrylate | 1 : 1 |
| 11 | Chlorinated Polyethylene (Alloprene CPE 20) | n-Butyl acrylate + 20% AGD* | 1 : 1 |
| 12 | Chlorinated Rubber (Alloprene R 20) | n-Butyl acrylate | 1 : 1 |
| 13 | Chlorinated Rubber (Alloprene R 20) | n-Butyl acrylate + 20% AGD* | 1 : 1 |
| 14 | Chlorinated Rubber (Alloprene R 20) | 2-Ethyl hexyl acrylate | 1 : 1 |

*AGD = Ethylene glycol dimethacrylate
Alprodur 646 J is the tradename of a product of Farbwerke Hoechst ag;
Parlon P 20 is the tradename of a product of Hercules Powder Co.; and
Alloprene CPE 20 and Alloprene R 20 are tradenames of products of Imperial Chemical Industries, Ltd.

Table 2

| Test No. | Intensity of Irradiation Megarad/Sec. | Hardening Dose Megarad | Insoluble Part in % At the Hardening Dose | Insoluble Part in % 2Mrad above the Hardening Dose |
|---|---|---|---|---|
| 1 | 3 | 3.25 | 64 | 65 |
| 2 | 12 | 4.25 | 68 | 83 |
| 3 | 3 | 4.25 | 65 | 81 |
| 4 | 6 | 5.5 | 63 | — |
| 5 | 9 | 7.5 | 63 | — |
| 6 | 12 | 4.0 | 86 | 94 |
| 7 | 12 | 2.25 | 45 | 60 |
| 8 | 3 | 12.0 | 80 | 80 |
| 9 | 3 | 2.25 | 48 | 64 |
| 10 | 12 | 3.25 | 43 | 61 |
| 11 | 3 | 2.5 | 47 | 62 |
| 12 | 12 | 4.0 | 30 | 58 |
| 13 | 3 | 4.25 | 49 | 69 |
| 14 | 12 | 5.0 | 62 | 75 |

Table 3

| Film Thickness in microns | Hardening Dose (Intensity of Radiation) 12 Mrad/sec. | % Insoluble Portion If Hardening Dose is Applied |
|---|---|---|
| 30 | 3.5 | 72 |
| 60 | 4.0 | 74 |
| 90 | 4.25 | 68 |
| 120 | 4.5 | 73 |

EXAMPLE III

90 Micron thick films of various synthetic resin mixtures were applied, irradiated and tested in the same manner as that described in Example I. The irradiation took place in a nitrogen atmosphere, however. Table 4 shows the films hardened by irradiation with electrons, the harding dose required and the insoluble portion in %.

Table 4

| Prepolymer | Monomer | Weight Ratio Prepolymer: Monomer | Intensity of Irradiation Mrad/sec. | Hardening Dose Mrad | Insoluble Part in % at the Hardening Dose |
|---|---|---|---|---|---|
| Chlorinated Polypropylene (Alprodur 646 J) | n-Butyl acrylate | 1 : 1 | 12 | 1.75 | 71 |
| Chlorinated Polyethylene (Alloprene CPE 20) | n-Butyl acrylate | 1 : 1 | 12 | 1.75 | 65 |
| Chlorinated Rubber (Alloprene R 20) | n-Butyl acrylate | 1 : 1 | 12 | 2.0 | 27 |

EXAMPLE II 30 to 120 micron thick films of a synthetic resin mixture which contains one part of a chlorinated polypropylene (Alprodur 646 J) mixed with one part n-butyl acrylate, were applied, irradiated and tested in the same manner as described in Example I.

Table 3 below lists the variation of the hardening dose with the thickness of the film.

A comparison with Table 1 shows that a smaller dose is required for hardening this synthetic resin solution if the irradiation takes place in an oxygen-poor atmosphere.

EXAMPLE IV

90 Micron thick films of a synthetic resin mixture of 1 part of a chlorinated polyethylene (Alloprene CPE 20) mixed with 1 part n-butyl acrylate were applied to sandblasted steel sheets (St 12-3-thickness of sheet 2.5 mm-surface blasted with quartz sand with a grain size of 1 mm). These steel sheets were irradiated, as described in Example I, with an intensity of 12 megard-/second. The films were then immediately examined for surface stickiness and surface hardness, as described in Example I. It was found that the films can be hardened with a radiation dose of 4.0 megarad.

After a few days, additional tests of the films were made. The dry-film thickness was measured nondestructive. The film thickness was 70 microns. The scratch hardness of the lacquer was measured according to Clemen. The hardness of the films was grade 5, "hard" (can be scratched through with 200 pond). The adhesion was determined by cutting a grid pattern in the lacquer and subsequent cupping. (Size of specimen 100×100 mm). The coating cracked after cupping to 15 mm. The properties of the lacquer during bending of the material was tested by bending a specimen over a mandrel. (Size of specimen 30×100 mm). The coating is torn off if the specimen is bent over a 3 mm mandrel. The corrosion resistance of the coating was determined in a synthetic industrial atmosphere, after a grid pattern was cut in the coating and the material was cupped 14 mm deep. (Size of specimen 70×100 mm). After 22 cycles rusting under the coating was observed and also discoloration in the areas that had not been deformed.

An unsaturated polyester resin wasa prepared for comparison by condensation of 14.7 parts isophthalic acid, 15.3 parts fumaric acid, 9.4 parts propylene glycol, 10.6 parts diethylene glycol, and dissolved in 50 parts styrol. The resin was stabilized with 50 ppm (parts per million) hydroquinone.

90 Micron thick films of this polyester resin solution were applied to sandblasted steel sheets (St 12–03 thickness of sheet 2.5 mm-surface blasted with quartz sand with 1 mm grain size). These steel sheets were irradiated, as described above and then tested. It was found that the films can be hardened with an irradiation dose of 15.0 megarad.

After a few days further tests were made on the films, as described above. The dry film thickness was 80 micron. The films had a hardness of 8, "very hard". (Can be scratched through with 300 pond). After cupping 7 mm deep the coating cracked and peeled. Slight bending caused large cracks. After 22 cycles to test corrosion resistance rust was observed underneath the coating and also discoloration in that areas that were not deformed.

These tests show that a considerably higher radiation dose is required for the unsaturated polyester resin and that one obtains considerably lower adhesion, flexibility and elongation.

EXAMPLE V

90 Micron thick films of a synthetic resin mixture based on chlorinated polypropylene (Alprodur 646 J) and n-butyl acrylate (1:1) with various stabilizers was applied in the same manner as described in Example I, and then irradiated and tested. Table 5 gives the results that were obtained. Table 5 shows if a number of stabilizers are added to the synthetic resin mixture the resin mixture can be hardened and cross-linked after exposure to the same irradiation dose as without the addition of softeners.

EXAMPLE VI

Various systhetic resin mixtures, as listed in Table 6 were filled into small tubes with 2 cm diameter to a height of approximately 2.5 cm and exposed to the gamma radiation of a Co–60 radiation source. These tests were made at 20°C. and in the presence of oxygen. After the irradiation the degree of cross-linking was determined by extraction with toluene, as described in Example I. All tests were made with an irradiation intensity of 0.7 megarad/hour. Table 6 gives the percentage of insoluble material obtained after irradiation with doses of 0.5, 1.0, and 1.5 megarad. The table shows also that the tested synthetic resin mixtures can be cross-linked to a high degree by irradiation with gamma rays.

Table 5

| Stabilizers | Intensity of Irradiation Mrad/sec. | Hardening Dose Mrad | Insoluble Part in % | | Characteristics of film |
| --- | --- | --- | --- | --- | --- |
| | | | At Hardening Dose | 2 Mrad above Hard. Dose | |
| none | 12 | 4.25 | 68 | 83 | Flexibility — good, tough<br>Surface hardness — good<br>(Pencil hardness 4)<br>Light brown color |
| 1% Epoxized soybean oil | 12 | 4.25 | 82 | 90 | Flexibility — good, tough<br>Surface hardness — good<br>(Pencil hardness 3–4)<br>Colorless |
| 2% Epoxized soybean oil | 12 | 4.25 | 80 | 84 | Flexibility — good, tough<br>Surface hardness — good<br>(Pencil hardness 4)<br>Colorless |
| 2% Butyl glycidyl ether | 12 | 4.25 | 72 | 79 | Flexibility — good, tough<br>Surface hardness — good<br>(Pencil hardness 4)<br>Colorless |

Table 6

| | Prepolymer | | Weight Ratio Prepolymer: Monomer | Insoluble Part in % | | |
|---|---|---|---|---|---|---|
| | | | | 0.5 Mrad | 1.0 Mrad | 1.5 Mrad |
| 1 | Chlorinated Polypropylene (Alprodur 646 J) | n-Butyl acrylate | 1 : 1 | 78 | 84 | 93 |
| 2 | Chlorinated Polypropylene (Alprodur 646 J) | n-Butyl acrylate + 20% AGD* | 1 : 1 | 83 | 85 | 86 |
| 3 | Chlorinated Polypropylene (Alprodur 646 J) | n-Butyl acrylate | 4 : 6 | 83 | 92 | 92 |
| 4 | Chlorinated Polypropylene (Alprodur 646 J) | n-Butyl acrylate | 3 : 7 | 79 | 90 | 91 |
| 5 | Chlorinated Polyethylene (Alloprene CPE 20) | n-Butyl acrylate | 1 : 1 | 89 | 93 | 98 |
| 6 | Chlorinated Rubber (Alloprene R 20) | n-Butyl acrylate | 1 : 1 | 74 | 93 | 96 |

\* AGD = Ethylene glycol dimethacrylate

Although emphasis in the description of this invention has been placed upon radiation-hardenable compositions comprising or consisting essentially of specifically selected chlorinated polyolefins and reactive olefinically unsaturated monomers as a coating material, the invention is also applicable to the production of materials other than coatings, such as structural shapes, e.g. sheet materials, load supporting members such as cylinders, posts and angles, as well as tubing and the like, prepared by exposing suitably shaped materials comprising a selected chlorinated polyolefin and a reactive olefinically unsaturated monomer to ionizing radiation. The resulting compositions, structural shapes and members possess special properties which make such shapes and members especially useful.

As will be apparent to those skilled in the art in the light of the foregoing disclosure, many alterations, substitutions and modifications are possible in the practice of this invention without departing from the spirit or scope thereof.

What is claimed is:

1. A method which comprises coating a substrate with a mixture consisting of at least one member selected from the group consisting of chlorinated polyethylene, chlorinated polypropylene, chlorinated polybutylene and chlorinated rubber together with at least one member selected from the group consisting of ethyl acrylate, butyl acrylate, butyl methacrylate and ethyl hexyl acrylate and exposing the coating to a sufficient amount of ionizing radiation to harden said mixture and form a protective coating on said substrate.

2. A method in accordance with claim 1 wherein said ionizing radiation is a beam of electrons having an average energy of at least 50 keV and not more than 4,000 keV.

3. A method in accordance with claim 1 wherein said ionizing radiation is X-ray radiation.

4. A method in accordance with claim 1 wherein said ionizing radiation is γ-ray radiation.

5. A method in accordance with claim 1 wherein said first mentioned member is selected from the group consisting of chlorinated polyethylene, chlorinated polypropylene and chlorinated rubber.

6. A method as in claim 1 wherein the chlorinated rubber is chlorinated natural rubber.

7. A method as in claim 1 wherein the chlorinated rubber is chlorinated synthetic rubber.

8. A method in accordance with claim 1 wherein said coating has a thickness in the range from about 20 to about 500 microns and wherein said ionizing radiation comprises a beam of electrons having an average energy of 50 to 600 keV.

9. A method in accordance with claim 1 including heat treatment of the applied coating.

10. A method in accordance with claim 9 wherein the applied coating is heated before being exposed to the ionizing radiation.

11. A method in accordance with claim 9 wherein the applied coating is heated after having been exposed to ionizing radiation.

12. A method in accordance with claim 9 wherein the applied coating is heated while being exposed to ionizing radiation.

13. A method in accordance with claim 1 wherein said coating is exposed to said ionizing radiation in a substantially oxygen-free atmosphere.

14. A method in accordance with claim 1 wherein said synthetic resin mixture contains a minor effective amount of a polymerization catalyst which is capable of forming free radicals.

15. A method in accordance with claim 1 wherein one component of the mixture is chlorinated polypropylene and another component of the mixture is butylacrylate.

16. A method in accordance with claim 2 wherein said synthetic resin mixture contains a minor amount of fillers, pigments, plasticizers, stabilizing agents, or mixtures thereof.

\* \* \* \* \*